No. 806,940. PATENTED DEC. 12, 1905.
G. N. TODD.
COTTON HARVESTER.
APPLICATION FILED SEPT. 14, 1899.
2 SHEETS—SHEET 1.
Fig. 1
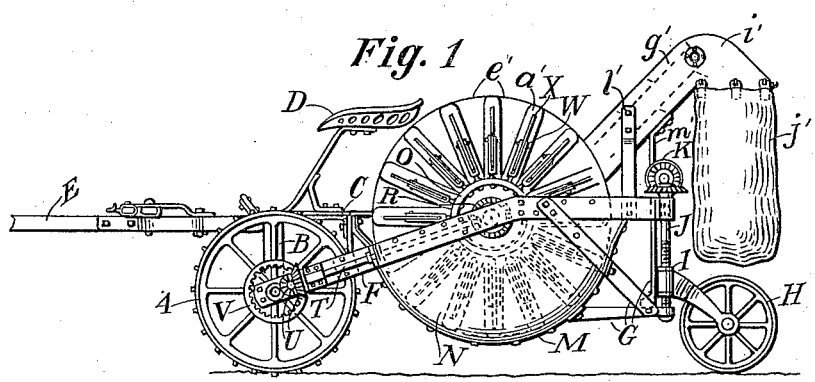
Fig. 2
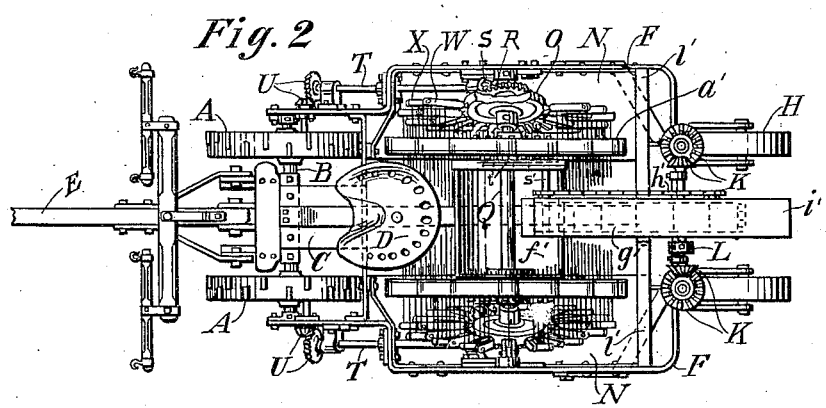
Fig. 3
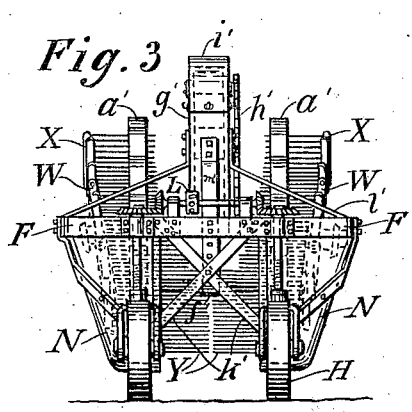
Fig. 6
Fig. 7 Fig. 8 Fig. 9
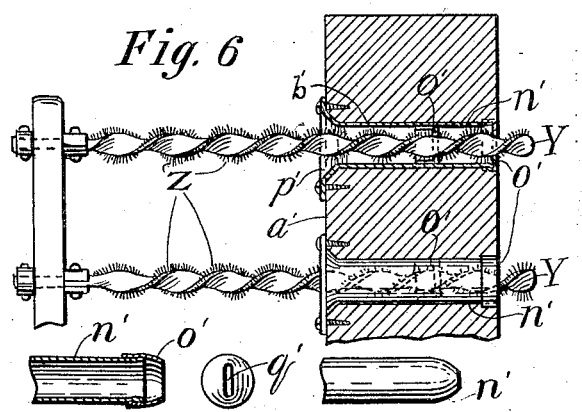
Witnesses
B. W. Pierce
M. F. Holmes
Inventor
George N. Todd No. 806,940. PATENTED DEC. 12, 1905.
G. N. TODD.
COTTON HARVESTER.
APPLICATION FILED SEPT. 14, 1899.
2 SHEETS—SHEET 2.
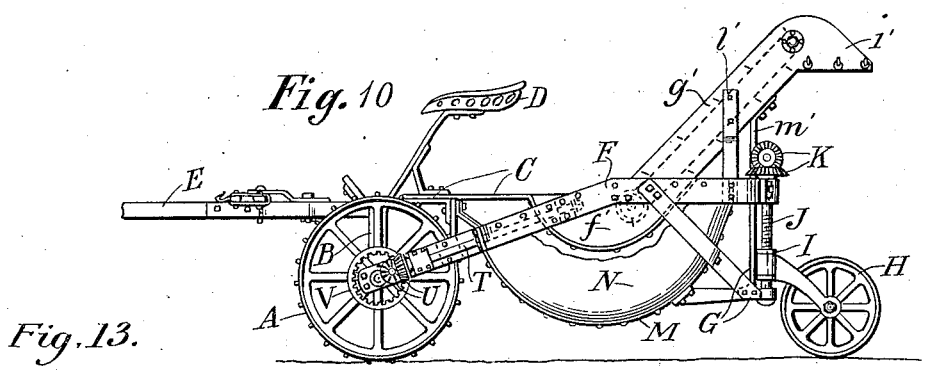
Fig. 10
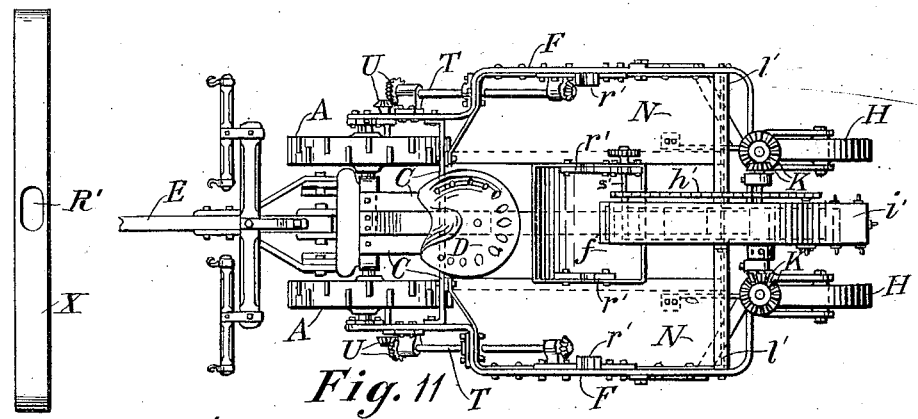
Fig. 13.
Fig. 11
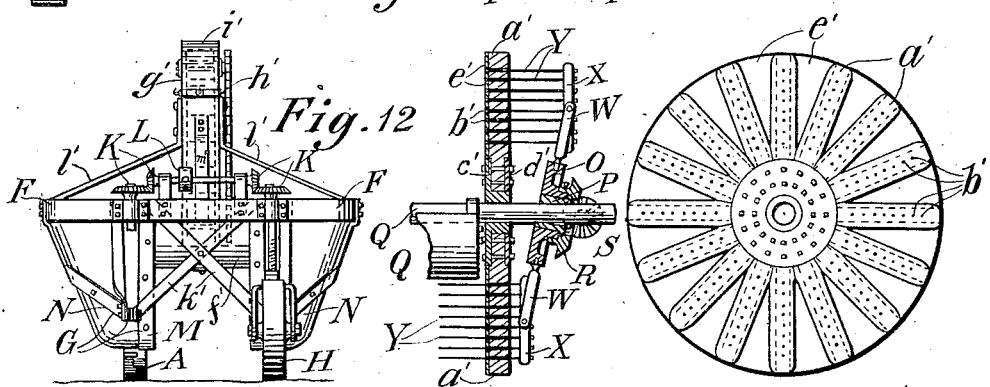
Fig. 12
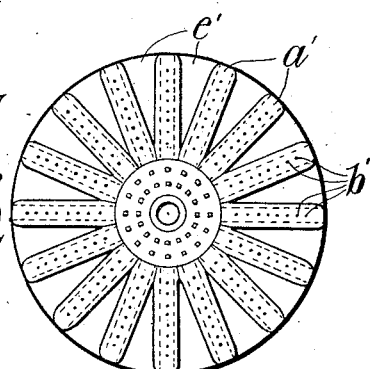
Fig. 4  Fig. 5
Witnesses
B. W. Pierce
M. F. Holmes
Inventor
George N. Todd

UNITED STATES PATENT OFFICE.

GEORGE N. TODD, OF LOS ANGELES, CALIFORNIA.

COTTON-HARVESTER.

No. 806,940.

Specification of Letters Patent.

Patented Dec. 12, 1905.

Application filed September 14, 1899. Serial No. 730,468.

*To all whom it may concern:*

Be it known that I, GEORGE N. TODD, a citizen of the United States of America, residing at Los Angeles, in the county of Los Angeles and State of California, have invented certain new and useful Improvements in Cotton-Harvesters; and I do declare the following to be a full, clear, and exact description of the invention, such as will enable others skilled in the art to which it appertains to make and use the same, reference being had to the accompanying drawings, and to the letters marked thereon, which form a part of this specification.

This invention relates to the improvements upon "cotton-harvesters," said improvements consisting of three important features—viz., rotatable wiper and picker wheels provided with cotton-pickers, a carrying and supporting frame for the picking mechanism mounted on ground-wheels, means for rotating the wiper and picker wheels in a direction opposite or contrary to that of the ground-wheels of the machine, and means for raising and lowering the said wiper and picker wheels and picking mechanism, the several parts of the machine being also improved by novel forms of construction.

The primal object of this invention is to form rotatable wiper and picker wheels for the purpose of harvesting cotton by carding the cotton off from the cotton-plants.

The second object is to provide said picker-wheels with carding-teeth consisting of a series of flexible spring-spindles formed of metal bands or in other suitable way and armed with bristle or hair teeth, the said spindles being secured in bars, levers, spokes, or arms and adapted to be pushed in and out of the guideways of the wiper-wheels by means of said levers, spokes, or arms, actuated by the said picker-wheels, thereby pushing said spindles in and out of guides formed in or secured to said wiper-wheels, thereby automatically wiping said spindles of the gathered cotton.

The third object is to provide a frame mounted on ground-wheels to carry, support, and rotate said wiper and picker wheels in a direction opposite or contrary to the travel of the ground-wheels or in any direction which is equivalent for the purposes of carrying out my invention and to actuate said wiper-wheels and said picker-wheels and said rotatable spindles and to raise and lower said picking or carding mechanism and adjust it to the cotton-rows by raising and lowering the ground-wheels of said frame.

The fourth object is to construct said machine and its parts in a novel, durable, and most effective manner.

These several objects are obtained by the devices illustrated in the accompanying drawings, in which—

Figure 1 is a side view of my invention. Fig. 2 is a plan view thereof. Fig. 3 is a rear view. Fig. 4 is a central vertical section view of the rotatable wiper and picker wheels and operating mechanism. Fig. 5 is a side view of the rotatable wiper-wheel by itself. Fig. 6 is a sectional detail of the wiper-wheel and the flexible spring sliding rotating picking teeth or spindles and spoke or bar. Figs. 7, 8, and 9 are modification details of the tube or guide through which the spindles are pushed and thereby rotated. Fig. 10 is a side view of the machine with the wiper and picker wheels removed to show the construction of the frame or carriage. Fig. 11 is a plan view thereof. Fig. 12 is a rear view thereof with one of the rear caster-wheels removed to show the brace-supports therefor. Fig. 13 is a front view of the push-bar X.

Similar letters of reference indicate the same parts in the drawings and the several figures thereof.

Referring by letter to the accompanying drawings, in Fig. 1, A indicates two front traction or drive wheels journaled upon a bent axle B, provided with a top platform and braces C, a driver's seat D being mounted upon the platform, to which is also connected a pole E and attachments for a team, the spindles of the bent axle B being rigidly secured to an iron bar F, the top of the bent axle B being also secured to said iron bar F by means of the platform and braces C. The bar F forms a U, connecting both the front wheels A, as described, and is provided with vertical and side brace-irons G, forming supports for the two caster-wheels H, provided with screw-collars I, upon which the hub of the fork of the caster-wheel swivels or swings, and by means of a screw-shaft J and gears K the caster-wheels are raised and lowered by means of a perforated collar L (seen in other views) on the cross-shaft connecting the two screw-shafts J, worked by means of a pin-lever inserted in the holes of the collar L and turning it, and thereby the two sets of bevel-gears K, simultaneously turning the two screw-shafts J, and thereby screwing up or down the caster-wheels H, and thereby raising and lowering the circular center part of the frame, which is formed as a shield for the picker and wiper wheels on each side by means of a circular iron band M, riveted to the bar F and the platform-braces C and to the braces G. A circular shield N is riveted to the bar F and bar M and the braces G. The shield N slopes or slants from the bar F, inclined down to and under the bottom of the rotatable wiper and picker wheels, thereby forming a shield for them, preventing their mechanism from coming in contact with dirt or trash. In Figs. 1, 2, and 4 this picker-wheel consists of a metallic wheel O, mounted at an angle to a central shaft Q by means of an angled hub or bushing P, keyed to the shaft Q, the hub of the metallic wheel O being provided with a gear R, meshing with a gear S on the end of a shaft T, connecting by bevel-gears U a stud and pinion with the internal gear V on the drive-wheel A. Pivoted to the rim of the wheel O so as to freely turn therein are a series of forks or levers W, pivoted at their outer ends to bars X, in which are journaled to rotate a series of flexible spiral-spring spindles Y, armed with brush-picking points Z, as seen in Fig. 6. These rotatable picking-spindles are pushed in and out through the spokes $a'$ of a light wiper-wheel. This wiper-wheel is preferably formed of a series of spokes $a'$, as in Fig. 5, each spoke being provided with a series of holes $b'$, the spokes $a'$ being bolted to a flanged hub $c'$ by means of a circular flange-plate $d'$ and are provided with thin sheet-metal plates $e'$, secured by screws along their edges to each spoke, thereby forming a circular sheet-metal surface on one side of said wiper-wheel, thereby preventing the entrance of limbs and trash between the spokes $a'$ of the wheel, the shield N of the frame covering the mechanism of the picker-wheel on the outside, while the plates $e'$ cover it on the inside, thus guarding it from the entrance of dirt or mud from either side or underneath, as further illustrated in Fig. 3, in which the spindles Y are seen pushed through the spokes $a'$ their full length under the central axle and the cylindrical hopper-box, so as to penetrate all parts of the cotton-plants, while they are withdrawn through the spokes $a'$ of the wiper-wheels at the top up over the axle and the mouth of the hopper-box to thereby wipe off the cotton from the spindles, thereby automatically wiping them of the gathered cotton and dropping it into the hopper $f'$, from which it is scraped out by the elevator-chain and scrapers running in the elevator box or chute $g'$, operated by a side chain and sprockets $h'$, the cotton falling out of the hood or cap piece $i'$ into the sacks $j'$, hung on hooks secured to said hood-piece $i'$, these details being more clearly shown in Figs. 10, 11, and 12. It will also be seen by Figs. 3 and 12 that the rudder or caster wheels H are kept from spreading by means of cross-tie braces $k'$ and that the elevator box or chute $g'$ is secured to the iron bar F by means of braces $l'$ and an upright brace $m'$. In Fig. 6 it will be seen that the holes $b'$ of the spokes $a'$ are provided with metallic tubes $n'$, provided with two slotted caps $o'$ $o'$, one toward the center within the tube $n'$, while the other forms the outer cap thereof, the improvement consisting in that I use a funnel-mouth $p'$ or rounded bevel entrance for the spindles to prevent the binding, catching, and holding of them on an edge surface, as is the case with straight tubes, causing friction and entanglement of the spindles, and I also avoid further friction by the use of a single slotted cap $o'$, as in Fig. 7, or by forming the tube by dies or spinning into one slotted piece, as in Figs. 8 and 9. Thus the tube would be, as in Fig. 6, with a funnel-mouth and a funnel-like slotted end, as in Figs. 8 and 9—in other words, forming the bevel funnel-mouth, the tube, and the funnel slotted end all in one piece, the slot being made long and narrow and in the center, as $q'$ in Fig. 8. It is also preferred to assemble the picker-wheels and the wiper-wheels upon a central shaft Q and provide the frame with boxes $r'$, with removable caps, whereby the axle and the entire wiping and picking mechanism can be removed. It will also be understood that the spindles are rotated by the tubes $n'$, which being screwed fast to the spokes $a'$ then the bar X being pushed to and from the spokes $a'$ the spindles Y are caused to rotate on individual axes by their spirals turning or screwing their way out through the slots of the caps $o'$ of the tubes $n'$, obtaining thereby a rotation in one direction while being pushed through the spokes $a'$ to pick cotton and a rotation in a reverse direction when drawn back through the spokes $a'$ to wipe off the gathered cotton. It will be understood that if the picking-spindles are formed flat without spiral twists that they will do good work in picking cotton and wiping themselves thereof simply by sliding in and out of the wiper-wheel without rotating on their individual axes.

In the operation of my invention the machine is drawn straddling over and along a cotton-row, the cotton-plants passing through the open passage under the machine. The picker-wheels being rotated in a direction opposite or contrary to the travel of the ground-wheels of the machine by the wheels A actuating the gear connections, the picking-spindles Y are pushed through the spokes $a'$ of the two wiper-wheels and combed up through the cotton-plants on both sides thereof, rotating on their individual axes, thereby winding the ripe cotton upon themselves, and as they arrive at the top of the wiper-wheels up over the cotton receptacle or hopper $f'$ they are drawn entirely back into the spokes $a'$ of the said wiper-wheels, thereby wiping the cotton from them, which, falling into the receptacle *f'*, is scraped out by the scrapers of the elevator-chain and carried into the sacks *j'*, which are hung to the hood of the elevator by hooks, the sacks being changed for empty ones as fast as filled by the driver of the machine. The spindles are projected in and out through the guides of the wiper-wheel, thereby automatically being rotated and wiped as long as the machine is in motion, the elevator internal chain and its scrapers being caused to travel by an outside chain *h'*, driven by sprockets and a stud-shaft *s'*, and a pinion-gear meshing with a gear *t'*, (indicated by dotted lines *t'* in Fig. 2, as secured to the right-hand wiper-wheel.) It will also be obvious that the spindles may be made flat or spiral and operated with or without rotating on their own axes.

It will be obvious that the distance of the point where the bar X and the fork, spoke, or lever W are pivoted together from the axes of the central shaft or axle Q of the wiper-wheel *a'* varies as the wiper-wheel and the inclined actuating-wheel O are rotated, being a maximum when W is horizontal and a minimum when W is vertical. For this reason the cotton pickers or spindles Y could not be pushed back and forth through the wiper-wheel and thereby rotated on their own axes, were the said bar X and fork or lever W tightly riveted together, and therefore to overcome and provide for this maximum and minimum motion the bar X is bored a free fit or provided with a slot R', Fig. 13, to permit of automatic adjustment of the said bar X and fork W. It will also be obvious that this variation of motion may also be overcome by allowing freedom of play in the parts where the fork W is journaled or pivoted in the inclined wheel O, thus allowing the fork W to rise and fall in the said wheel O a distance sufficient to thereby equalize the said variation of motion. It will also be obvious that if the cotton-pickers Y are made springy or flexible that they will give in themselves sufficiently to equalize and overcome the said variation of motion.

Having described my invention, what I claim is—

1. A cotton-harvester, consisting of a frame or carriage mounted on ground-wheels, said frame carrying and supporting two wiper-wheels provided with guideways, cotton-pickers, means for pushing said pickers into and out of the guideways of said wiper-wheels, and rotating said pickers and wiper-wheels in a direction reverse to that of the ground-wheels of said carriage or frame, to thereby card or comb the cotton from the cotton-plants.

2. A cotton-harvester consisting of a frame or carriage mounted on ground-wheels, wiper-wheels provided with guides and journaled to rotate in said carriage, cotton-pickers arranged in radial lines in said guides of said wiper-wheels and adapted to be projected or pushed in and out from said guides of the wiper-wheels in lines parallel with the horizontal axes of the wiper-wheels, means for rotating said pickers and wiper-wheels, and pushing the cotton-pickers in and out of the guides of the wiper-wheels thereby wiping said spindles, and means for depositing the gathered cotton in a cotton-receptacle.

3. A cotton-harvester frame or carriage provided with two ground-wheels, two adjustable caster-wheels, a cotton receptacle and elevator, a rotatable cotton-picking wheel and a wiper-wheel on each side of said receptacle and elevator, picking-spindles carried by and movable with said picking-wheels, and means for rotating the picking and wiper wheels in a direction reverse to that of the ground-wheels.

4. A cotton-picking wiper-wheel consisting of a series of spokes secured to a hub and provided with a series of holes or apertures forming guides and wipers, combined with picking-spindles in said guides.

5. A tube for cotton-pickers, having a beveled or funnel mouth at one end adapted to be secured to a support, the other end being closed except a narrow slot adapted to rotate and wipe the picker, combined with a picker or spindle of spiral form in said tube.

6. The combination of a fixed central axle, a bushing-hub keyed thereto and having its axis at an angle to the axis of the axle, a cotton-picker wheel mounted on said hub and rotating at an angle to the axle, radial arms journaled to said wheel, bars pivoted to said arms, a rotatable wiper-wheel, rotatable spiral cotton-picking spindles journaled at one end in said bars, the other ends of said spindles being sleeved in said wiper-wheel, said wiper-wheel being journaled to rotate upon said central axle, a gear on the hub of the cotton-picking wheel, and means for rotating said cotton-picking wheel and thereby rotating said wiper-wheel and sliding said spindles in and out of the wiper-wheel, by which latter they are wiped and rotated.

7. A cotton-picking wiper-wheel consisting of a series of spokes secured to a hub, and provided with a series of slots forming guides and wipers for cotton-picking spindles and adapted to rotate said spindles, and a guard or shield closing the spaces between the spokes.

8. A cotton-harvester consisting of a carriage mounted on ground-wheels, a cotton receptacle and elevator attached to said carriage, a rotatable and inclinable cotton-picking wheel, rotatable picking-spindles carried thereby, a rotatable wiper-wheel having apertures engaged by said spindles, means for rotating the said picking-wheel, and means for depositing the gathered cotton in the receptacle.

9. The combination of a horizontal axle, a wiper-wheel journaled on said axle and provided with guides, cotton-picking spindles moving bodily with the wiper-wheel and also moving in said guides in lines parallel with the horizontal axis of the wheel, the guides acting to rotate the spindles and wipe the same, a carriage supporting said axle and mounted on ground-wheels, and means for carrying said spindles around said axle.

10. A cotton-harvesting machine, comprising a wheel, a series of guides carried by said wheel, a series of cotton-pickers working in said guides, an inclined wheel associated with the wheel carrying the guides, and a connection between said inclined wheel and each of said pickers, said connection comprising two parts pivotally connected together, one part connected with the picker and the other part connected with the inclined wheel.

11. A cotton-harvesting machine, comprising a wiper-wheel, a series of guides carried by said wiper-wheel, a series of cotton-pickers working in said guides, a wheel associated with said wiper-wheel, a connection between said associated wheel and each of said pickers, said connection comprising two parts pivotally connected together, and adjustable carrying and ground wheels.

12. A cotton-harvesting machine, comprising a wiper-wheel, guides carried by the wiper-wheel, a series of rotary cotton-pickers sliding in and rotated and wiped by said guides, and means for carrying the cotton-pickers around the axis of the wiper-wheel and sliding them in said guides.

13. The combination of a wiper-wheel having guides, picker-spindles working in said guides, and a support carrying said spindles, said support rotating about an axis inclined to the axis of the wiper-wheel, whereby the spindles are carried around and reciprocated.

14. The combination of a wiper-wheel having guides, picker-spindles working in said guides, and a support carrying said spindles, said support rotating about an axis inclined to the axis of the wiper-wheel, whereby the spindles are carried around and reciprocated, and the spindles being of spiral form and rotated by said guides.

15. A cotton-harvesting machine, comprising a wheel; a series of guides carried thereby; a series of cotton-pickers mounted in said guides; an inclined wheel carrying a series of picker-supporting devices; said picker-supporting devices being movably connected with the wheel, whereby they may be given a radial movement as the wheel is rotated.

16. A cotton-harvesting machine, comprising a wheel; a series of guides associated therewith; a series of cotton-pickers working in said guides; an inclined wheel associated with the wheel carrying the guides; a series of bars connected with said inclined wheel and a series of compensating bars movably connected with said bars, said pickers being attached to said compensating bars.

17. A cotton-harvesting machine comprising wheels provided with a series of apertures, guides and inclosing devices, spiral cotton-pickers movably held therein, and means for screwing said cotton-pickers in and out of the guides.

In testimony whereof I affix my signature in the presence of two witnesses.

GEORGE N. TODD.

Witnesses:
JAMES P. CLARK,
SUSIE M. GRAY.